(12) United States Patent
Chillapalli et al.

(10) Patent No.: US 10,197,007 B2
(45) Date of Patent: Feb. 5, 2019

(54) METHOD AND SYSTEM FOR CONTROLLING CORE COWL VENT AREA

(71) Applicant: General Electric Company, Schenectady, NY (US)

(72) Inventors: Durga Srinivas Chillapalli, Karnataka (IN); Hemanth Gudibande Sathyakumar Kumar, Karnataka (IN); Bhaskar Nanda Mondal, Karnataka (IN); Kishanjit Pal, Karnataka (IN); Sushilkumar Gulabrao Shevakari, Karnataka (IN); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 14/995,661

(22) Filed: Jan. 14, 2016

(65) Prior Publication Data

US 2017/0204807 A1 Jul. 20, 2017

(51) Int. Cl.
| | |
|---|---|
| *F02K 1/06* | (2006.01) |
| *F02K 1/38* | (2006.01) |
| *F02K 3/06* | (2006.01) |
| *F02C 7/18* | (2006.01) |

(52) U.S. Cl.
CPC .............. *F02K 1/06* (2013.01); *F02C 7/18* (2013.01); *F02K 1/38* (2013.01); *F02K 3/06* (2013.01); *F05D 2220/36* (2013.01); *F05D 2260/205* (2013.01); *F05D 2260/608* (2013.01); *Y02T 50/675* (2013.01)

(58) Field of Classification Search
CPC ..... F02K 1/06; F02K 1/08; F02K 1/09; F02K 1/15; F02K 1/30; F02K 1/38; F02K 3/025; F02K 3/06; F02K 3/075; F02C 7/18

USPC .................... 60/771; 415/144, 148
See application file for complete search history.

(56) References Cited

U.S. PATENT DOCUMENTS

| | | | | |
|---|---|---|---|---|
| 4,064,692 A | * | 12/1977 | Johnson | ................. F02K 3/075 60/262 |
| 4,493,184 A | | 1/1985 | Nikkanen et al. | |
| 4,826,106 A | | 5/1989 | Anderson | |
| 5,806,302 A | | 9/1998 | Cariola et al. | |
| 5,833,140 A | | 11/1998 | Loffredo et al. | |

(Continued)

FOREIGN PATENT DOCUMENTS

| | | |
|---|---|---|
| EP | 2159403 A2 | 3/2010 |
| WO | 2015/012909 A2 | 1/2015 |

OTHER PUBLICATIONS

Extended European Search Report and Opinion issued in connection with corresponding EP Application No. 17150244.6 dated Jun. 9, 2017.

*Primary Examiner* — William H Rodriguez
(74) *Attorney, Agent, or Firm* — General Electric Company; Pamela Kachur (57) ABSTRACT

A variable core cowl vent nozzle system is described herein, the system including a core casing at least partially surrounding a core engine of a gas turbine engine, and a core cowl extending aftward from the core casing. The core cowl defines a core cowl vent area between the core cowl and a primary nozzle. At least one of the core cowl and the primary nozzle is movable to vary the core cowl vent area. A method for varying the core cowl vent area by moving one or more of the core cowl and the primary nozzle is also described herein.

20 Claims, 7 Drawing Sheets

(56) References Cited

U.S. PATENT DOCUMENTS

| | | | |
|---|---|---|---|
| 5,996,936 A * | 12/1999 | Mueller | B64D 33/04 239/265.17 |
| 6,129,311 A | 10/2000 | Welch et al. | |
| 6,170,254 B1 | 1/2001 | Cariola | |
| 7,673,442 B2 | 3/2010 | Seda et al. | |
| 8,096,105 B2 * | 1/2012 | Porte | F02K 1/50 60/226.3 |
| 8,434,309 B2 | 5/2013 | Levasseur | |
| 8,739,515 B2 | 6/2014 | Schwark, Jr. et al. | |
| 8,991,191 B2 | 3/2015 | Diaz et al. | |
| 2006/0230744 A1 * | 10/2006 | Beutin | F02K 1/006 60/231 |
| 2006/0242942 A1 * | 11/2006 | Johnson | B64C 15/02 60/228 |
| 2008/0110152 A1 | 5/2008 | Kemper et al. | |
| 2008/0112802 A1 * | 5/2008 | Orlando | F02K 1/08 415/208.1 |
| 2008/0141656 A1 * | 6/2008 | Beutin | F01D 9/065 60/262 |
| 2009/0064659 A1 * | 3/2009 | Alletzhauser | F02K 1/16 60/226.3 |
| 2010/0186369 A1 * | 7/2010 | Crosta | F02K 1/46 60/226.1 |
| 2013/0236294 A1 | 9/2013 | Vauchel et al. | |
| 2014/0037443 A1 * | 2/2014 | Khan | F02K 3/075 415/211.2 |
| 2016/0131077 A1 * | 5/2016 | Debray | F01D 25/243 60/770 |

* cited by examiner

METHOD AND SYSTEM FOR CONTROLLING CORE COWL VENT AREA

BACKGROUND

The field of the disclosure relates generally to gas turbine engines and, more particularly, to a method and system for varying a core cowl vent nozzle area.

In at least some known aircraft engine systems, an inner casing at least partially surrounds a core engine. A core cowl extending aftward from the inner casing defines a cowl nozzle or cowl vent area defined between the core cowl and an engine primary (core) nozzle. Pressurized gas is exhausted through this cowl nozzle, which can provide propulsive thrust to the aircraft. The pressurized gas that is piped through the core cowl and exhausted out the cowl vent may be used to cool accessories located outside the engine casing but within the core cowl. The core cowl is typically fabricated as a single, static component, dimensioned such that the cowl nozzle has a maximum area necessary during "worse-case" conditions, such as high-temperature take-off or certain hold conditions. However, this cowl vent area is often larger than needed during "better-case" conditions, such as cruise, such that the cooling air to the accessories may not be needed, and the cowl nozzle does not provide enough thrust and may even generate drag.

BRIEF DESCRIPTION

In one aspect, a variable core cowl vent nozzle system is provided. The variable core cowl vent nozzle system includes a core casing at least partially surrounding a core engine of a gas turbine engine, and a core cowl extending aftward from the core casing. The core cowl defines a core cowl vent area between the core cowl and a primary nozzle. At least one of the core cowl and the primary nozzle are movable to vary the core cowl vent area.

In another aspect, a method of varying a core cowl vent area is provided. The core cowl vent area is defined between a core cowl extending aftward from a core casing at least partially surrounding a core engine and a primary nozzle. The method includes moving at least one of the core cowl and the primary nozzle to vary the core cowl vent area.

In yet another aspect, a turbofan engine is provided, the turbofan engine include a core engine including a multistage compressor, a fan powered by a power turbine driven by gas generated in the core engine, a fan bypass duct at least partially surrounding the core engine and the fan, and a variable core cowl vent nozzle system. The variable core cowl vent nozzle system includes a core casing at least partially surrounding a core engine of a gas turbine engine, and a core cowl extending aftward from the core casing. The core cowl defines a core cowl vent area between the core cowl and a primary nozzle. At least one of the core cowl and the primary nozzle are movable to vary the core cowl vent area.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the cowl vent nozzle area control systems described herein provide a cost-effective method for varying a core cowl vent area to improve the thrust generated by a cowl vent nozzle, for example, during cruise conditions. Thereby, specific fuel consumption may be reduced. Additionally or alternatively, reducing an amount of air flow through the vent nozzle may improve engine performance. The cowl vent nozzle area control systems are configured to vary the core cowl vent area by moving one or more components of the cowl vent nozzle, such as at least a portion of a core cowl and/or at least a portion of a primary nozzle. In some embodiments, such movement is actuated using active controls, whereas in other embodiments, such movement is actuated using passive controls. In some embodiments, the cowl vent nozzle area control system includes additional vent variation components coupled to at least a portion of the cowl vent nozzle to vary the core cowl vent area thereof.

Figure 1:
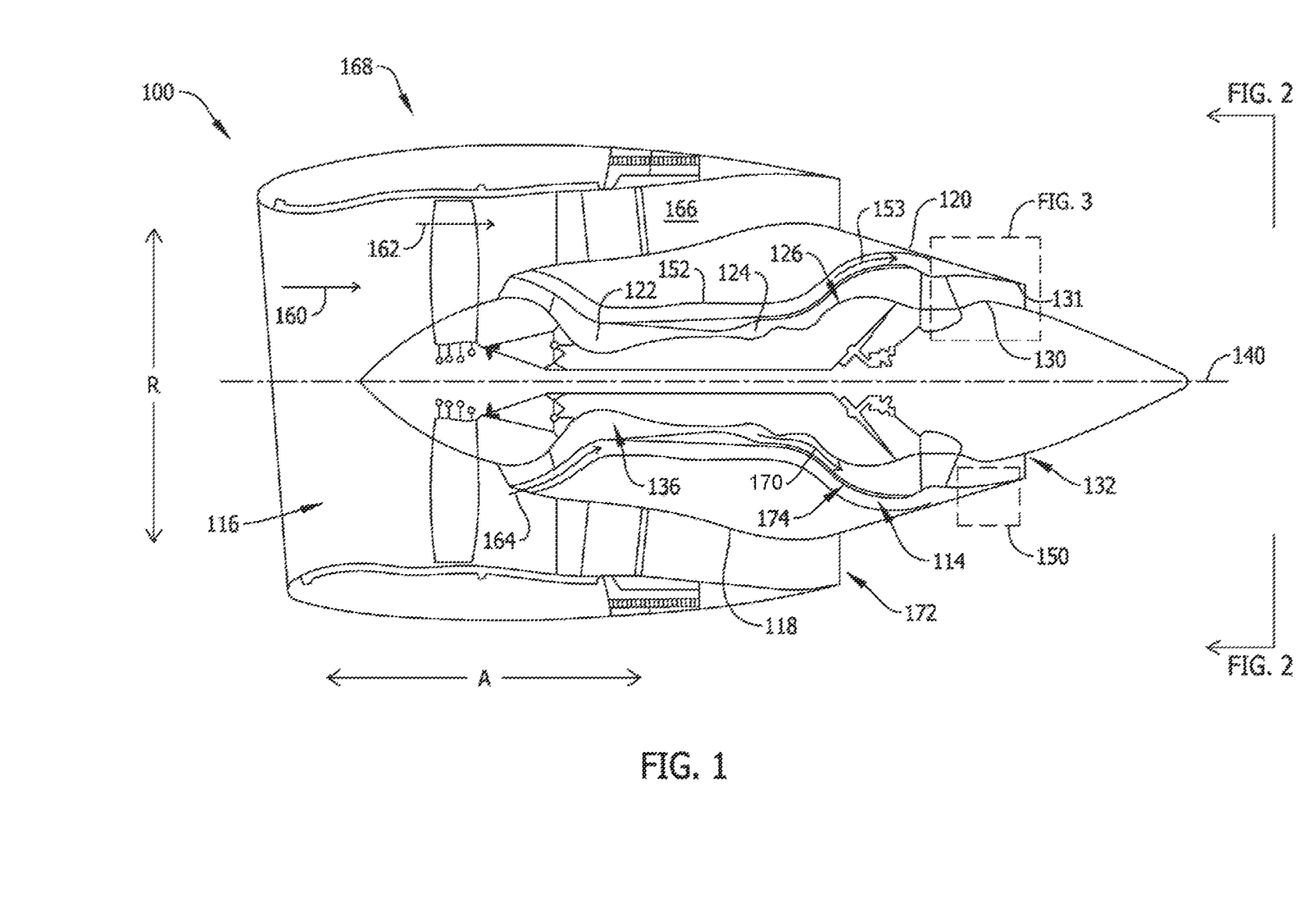
FIG. 1 is a first schematic illustration of an exemplary gas turbofan engine including a cowl vent nozzle area control system in accordance with an example embodiment of the present disclosure.
Figure 2:
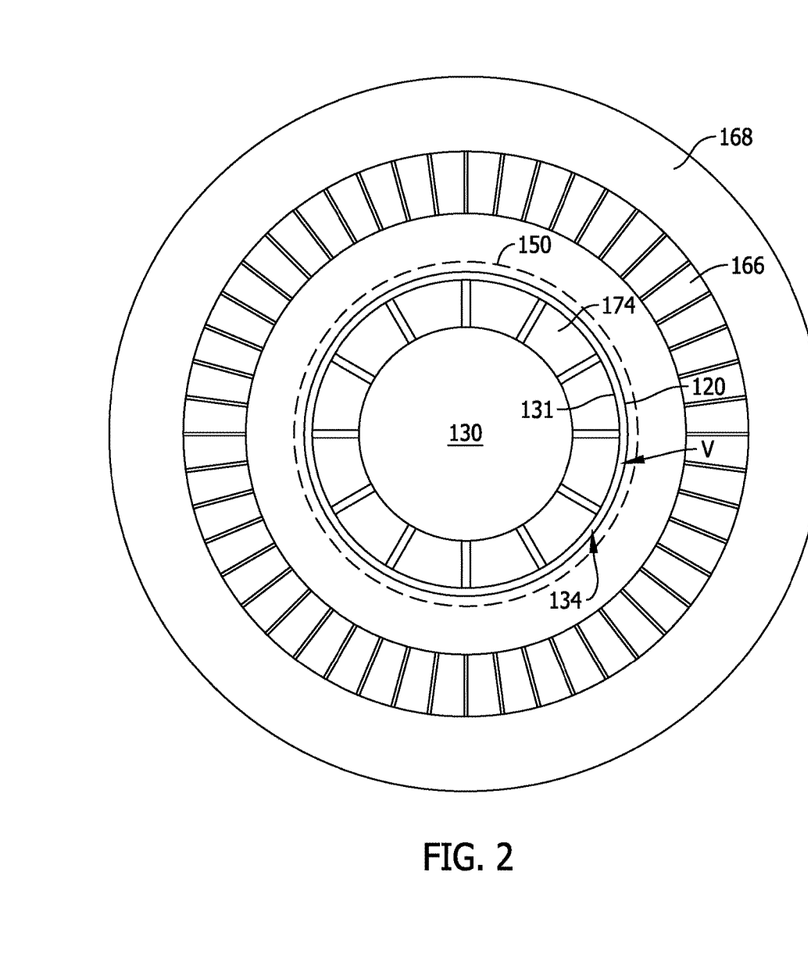
FIG. 2 is a second schematic illustration of the gas turbofan engine shown in FIG. 1.
Figure 3:
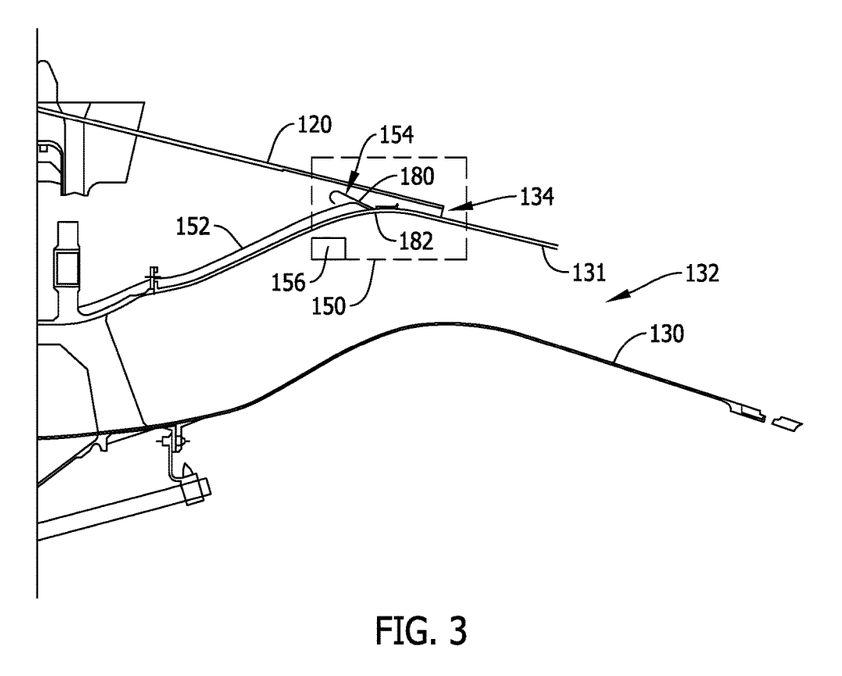
FIG. 3 is an enlarged view of the gas turbofan engine shown in FIG. 1.

FIGS. 1 and 2 are schematic illustrations of an exemplary gas turbofan engine 100 in accordance with an example embodiment of the present disclosure, and FIG. 3 is an enlarged view of turbofan engine 100. In the example embodiment, gas turbine engine 100 is embodied in a high-bypass turbofan jet engine. Turbofan engine 100 defines an axial direction A (extending parallel to a longitudinal centerline 140) and a radial direction R. In general, turbofan 100 includes a fan assembly 116 and a core engine 114 disposed downstream from fan assembly 116.

In the example embodiment, an approximately tubular core casing 118 at least partially surrounds core engine 114. Core casing 118 encases, in serial flow relationship, a compressor section 122; a combustion section 124; a turbine section 126; and a jet exhaust nozzle section 132. Jet exhaust nozzle section 132 is defined between an engine aft centerbody 130 and a primary nozzle 131. A core cowl 120 extends aftward from core casing 118, encasing a cowl vent nozzle 134 defined between core cowl 120 and primary nozzle 131. Cowl vent nozzle 134 defines a core cowl vent area V (see FIG. 2). As described further herein, a cowl vent nozzle area control system 150 is positioned adjacent to cowl vent nozzle 134 and is configured to facilitate variation of core cowl vent area V of cowl vent nozzle 134.

Compressor section 122, combustion section 124, turbine section 126, and jet exhaust nozzle section 132 together define a core air flowpath 136. During operation of turbofan engine 100, a volume of air 160 enters turbofan engine 100 through fan assembly 116. As volume of air 160 passes through fan assembly 116, a first portion 162 of volume of air 160 is directed or routed into a bypass airflow passage 166 (between core engine 114 and an annular nacelle 168) and a second portion 164 of volume of air 160 is directed or routed into core air flowpath 136, or more specifically into compressor section 122. A ratio between first portion 162 and second portion 164 is commonly referred to as a bypass ratio. The pressure of second portion 164 is then increased as it is routed through compressor section 122 and into combustion section 124, where it is mixed with fuel and burned to provide combustion gases 170.

Combustion gases 170 are routed through turbine section 126 where a portion of thermal and/or kinetic energy from combustion gases 170 is extracted via sequential turbine stages, driving rotation of at least one compressor in compressor section 122. Combustion gases 170 are subsequently routed through jet exhaust nozzle section 132 of core engine 114 to provide propulsive thrust. Simultaneously, the pressure of first portion 162 is substantially increased as first portion 162 is routed through bypass airflow passage 166 before it is exhausted from a fan nozzle exhaust section 172 of turbofan engine 100, also providing propulsive thrust. Bleed air from bypass airflow passage 166 may be used to cool engine equipment between core casing 118 and core cowl 120 and is exhausted through cowl vent nozzle 134. Turbine section 126 and jet exhaust nozzle section 132 at least partially define a hot gas path 174 for routing combustion gases 170 through core engine 114.

Turbofan engine 100 is depicted in FIGS. 1-3 by way of example only, and that in other exemplary embodiments, turbofan engine 100 may have any other suitable configuration including for example, a turboprop engine.

Cowl vent nozzle area control system 150 is configured to vary core cowl vent area V of cowl vent nozzle 134. As described above, in at least some known engine systems, cowl vent nozzle 134 is a static component and core cowl vent area V is sized at a large area to accommodate worse-case flight conditions (e.g., high-temperature take-off, certain hold conditions). Cowl vent nozzle area control system 150 facilitates reducing core cowl vent area V during alternative conditions (e.g., cruise), which improves the thrust provided at cowl vent nozzle 134. In turn, specific fuel consumption may be reduced.

In various embodiments, cowl vent nozzle area control system 150 includes mechanical, electrical, and/or thermal components configured to provide active and/or passive core cowl vent area V variation throughout a flight.

Primary nozzle 131, as seen in FIGS. 1 and 2, has a varying diameter along axial direction A. Accordingly, in some embodiments, cowl vent nozzle area control system 150 is configured to translate at least a portion of core cowl 120 in axial direction A with respect to primary nozzle 131 to vary core cowl vent area V. Additionally or alternatively, cowl vent nozzle area control system 150 may be configured to translate at least a portion of primary nozzle 131 in axial direction A to vary core cowl vent area V. More specifically, cowl vent nozzle area control system 150 may include one or more actuators, gears, levers, rails, cams, and/or other components configured to translate core cowl 120 and/or primary nozzle 131 in axial direction A.

In other embodiments, cowl vent nozzle area control system 150 is configured to translate at least a portion of core cowl 120 in radial direction R with respect to primary nozzle 131 to vary core cowl vent area V. Additionally or alternatively, cowl vent nozzle area control system 150 may be configured to translate at least a portion of primary nozzle 131 in radial direction R to vary core cowl vent area V. More specifically, cowl vent nozzle area control system 150 may include one or more actuators, gears, levers, rails, cams, and/or other components configured to translate core cowl 120 and/or primary nozzle 131 in radial direction R. In alternative embodiments, at least a portion of core cowl 120 and/or primary nozzle 131 is fabricated from a temperature-sensitive memory alloy or other "smart material". The respective portion of core cowl 120 and/or primary nozzle 131 is therefore configured to change shape and/or size according to temperature variations therein within a specific range. In other words, the respective portion of core cowl 120 and/or primary nozzle 131 fabricated from the memory alloy is configured to expand and contract in response to a temperature of air exiting cowl vent nozzle 134, to promote passive variation of core vent area V.

In some embodiments, cowl vent nozzle area control system 150 includes a vent area variation component 154 coupled to core cowl 120 and/or primary nozzle 131, configured to vary core cowl vent area V. For example, vent area variation component 154 may include a sealing component configured to expand and contract to vary core cowl vent area V. Vent area variation component 154 may be a circumferential component configured to uniformly (with respect to the circumference of cowl vent nozzle 134) vary core cowl vent area V. Alternatively, vent area variation component 154 is other than circumferential (e.g., segmented, discrete units, etc.). In one embodiment, cowl vent nozzle area control system 150 is configured to vent area variation component 154 using a thermal control system 152. Thermal control system 152 may include one or more pipes in flow communication with at least one of fan assembly 116, compressor section 122 (e.g., a compressor discharge plenum, not shown), combustion section 124, turbine section 126, and/or hot gas path 174 to receive an amount of supply air 153 therefrom. Thermal control system 152 may further include one or more valves configured to modulate the amount of supply air 153 delivered to vent area variation component 154, to promote active expansion and contraction of vent area variation component 154 to vary core cowl vent area V. In other embodiments, vent area variation component 154 of cowl vent nozzle area control system 150 includes at least one pivot (e.g., a hinge, rod, pin, etc.) about which at least a portion of core cowl 120 is configured to rotate in radial direction R to vary core cowl vent area V. Similarly, vent area variation component 154 of cowl vent nozzle area control system 150 may include at least one pivot (e.g., a hinge, rod, pin, etc.) about which at least a portion of primary nozzle 131 is configured to rotate in radial direction R to vary core cowl vent area V.

In the illustrated embodiment of FIG. 3, vent area variation component 154 includes a plate or flap 180 configured to rotate about a pivot 182. To reduce core cowl vent area V, cowl vent nozzle area control system 150 rotates flap 180 aftwardly about pivot 182. Rotating flap 180 forwardly about pivot 182 subsequently increases core cowl vent area V. As described above, flap 180 may be a single circumferentially disposed flap. Alternatively, flap 180 as illustrated may represent one unit of a plurality of flaps 180 disposed about the circumference of cowl vent nozzle 134.

In embodiments in which at least a portion of core cowl 120 is configured to be translated and/or rotated in axial direction A and/or radial direction R, core cowl 120 may include two or more segmented portions to facilitate such translation. Additionally, core cowl 120 may include a sealing mechanism between segmented portions. Sealing mechanisms may include, for example, overlapping segments with a sealing material therebetween, labyrinth seals, bellows-type seals, and/or other sealing mechanisms. Similarly, in embodiments in which at least a portion of primary nozzle 131 is configured to be translated in axial direction A and/or radial direction R, primary nozzle 131 may include two or more segmented portions to facilitate such translation, with sealing mechanism(s) therebetween.

Cowl vent nozzle area control system 150 further includes a controller 156. Controller 156 is configured to transmit control signals to control components of cowl vent nozzle area control system 150, such as translatable and/or rotatable portions of core cowl 120 and/or primary nozzle 131, thermal control system 152, and vent area variation component 154. Controller 156 may be configured to facilitate active control of cowl vent nozzle area control system 150, for example, using feedback loops configured to vary core cowl vent area V according to measured parameters and/or schedules configured to vary core cowl vent area V according to flight conditions (e.g., to increase core cowl vent area V during one portion of a flight and to decrease core cowl vent area V during another portion of the flight) or time intervals.

Tables 1 and 2, below, show examples of how a reduction in core cowl vent area V reduces specific fuel consumption. More specifically, Table 1 shows the results from a first implementation in a first example turbofan engine 100, and Table 2 shows the results from a second implementation in a second example turbofan engine 100. "Actual" refers to a measurement of the corresponding parameter without any variation in core cowl vent area V. "Closed" refers to a measurement of the corresponding parameter with a reduced cowl vent area V.

TABLE 1

First implementation of cowl vent nozzle area control system

| Parameter | Actual | Closed | % Change |
|---|---|---|---|
| Area (in$^2$) | 81 | 51 | −37.04 |
| Nozzle pressure ratio[1] | 1.1417 | 1.2468 | 9.21 |
| Nozzle inlet total pressure (psia) | 3.7637 | 4.1103 | 9.21 |
| Specific Fuel Consumption | 0.52739 | 0.52633 | −0.20 |

[1]Ratio of pressure from nozzle 134 to nozzle 172

TABLE 2

Second implementation of cowl vent nozzle area control system

| Parameter | Actual | Closed | % Change |
|---|---|---|---|
| Area (in$^2$) | 230 | 150 | −35.0 |
| Nozzle pressure ratio[1] | 1.122 | 1.225 | 9.2 |
| Nozzle inlet total pressure (psia) | 3.467 | 3.921 | 9.21 |
| Specific Fuel Consumption | 0.51483 | 0.51338 | −0.25 |

[1]Ratio of pressure from nozzle 134 to nozzle 172

Figure 4:
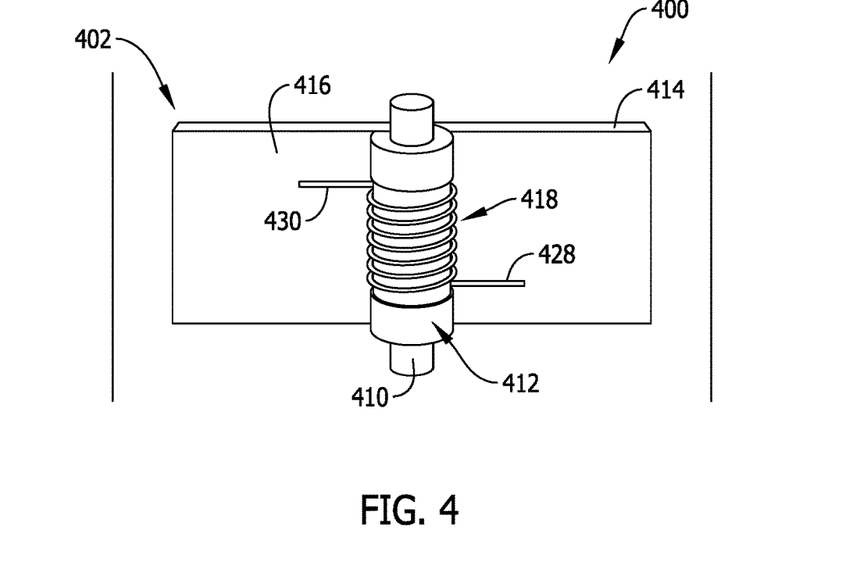
FIG. 4 depicts a first alternative embodiment of a vent area variation component of the cowl vent nozzle area control system shown in FIGS. 1-3 in an open or low-pressure configuration.
Figure 5:
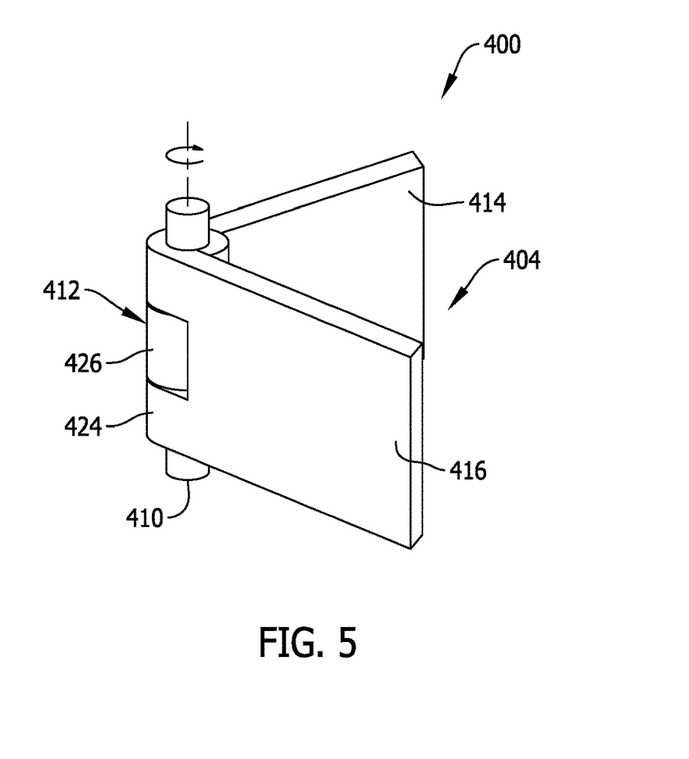
FIG. 5 depicts the vent area variation component shown in FIG. 4 in a partially closed or high-pressure configuration.

FIGS. 4 and 5 illustrate a first alternative embodiment of a vent area variation component 400 of cowl vent nozzle area control system 150. More specifically, FIG. 4 depicts vent area variation component 400 in an open or low-pressure configuration, and FIG. 5 depicts vent area variation component 400 in a partially closed or high-pressure configuration. Vent area variation component 400 may be similar to vent area variation component 154 (shown in FIG. 3). Vent area variation component 400 includes a pin 410, a hinge 412, a first plate 414, a second plate 416, and a spring 418. Hinge 412 surrounds pin 410, which provides a rotation axis for hinge 412. In addition, hinge 412 includes a first portion 424 coupled to first plate 414 and a second portion 426 coupled to second plate 416. First portion 424 may be integral to first plate 414, and/or second portion 426 may be integral to second plate 416. Spring 418 surrounds at least a portion of hinge 412 and is coupled at a first end 428 to first plate 414 and at a second end 430 to second plate 416. Spring 418 has a spring constant sufficient to maintain a vent area variation component 400 in open configuration 402 at low pressures (e.g., at high altitudes during cruise conditions), in which first and second plates 414, 416 are substantially parallel, but to allow first and second plates 414, 416 may pivot about pin 410 towards each other at higher pressures (e.g., at lower altitudes during take-off or landing conditions). In one example embodiment, first and second plates 414, 416 pivot into a substantially face-to-face relationship. Alternatively, first plate 414 may pivot about pin 410 towards second plate, or second plate 416 may pivot about pin 410 towards first plate 414.

Cowl vent nozzle area control system 150 may include a plurality of vent area variation components 400 positioned in cowl vent nozzle 134, for example, at regular intervals therearound. Pin 410 of each vent area variation component 400 may be coupled to core cowl 120 and/or primary nozzle 131, and may span across cowl vent nozzle 134 from core cowl 120 to primary nozzle 131. Accordingly, when vent area variation component 400 is in open configuration 402 at low pressures (e.g., during cruise), core cowl vent area V may be reduced, as a portion of core cowl vent area V is blocked by open first and second plates 414, 416. When vent area variation component 400 is in closed configuration 404 at high pressures, core cowl vent area V may be substantially unobstructed by first and/or second plates 414, 416, such that core cowl vent area V is at a maximum.

Figure 6:
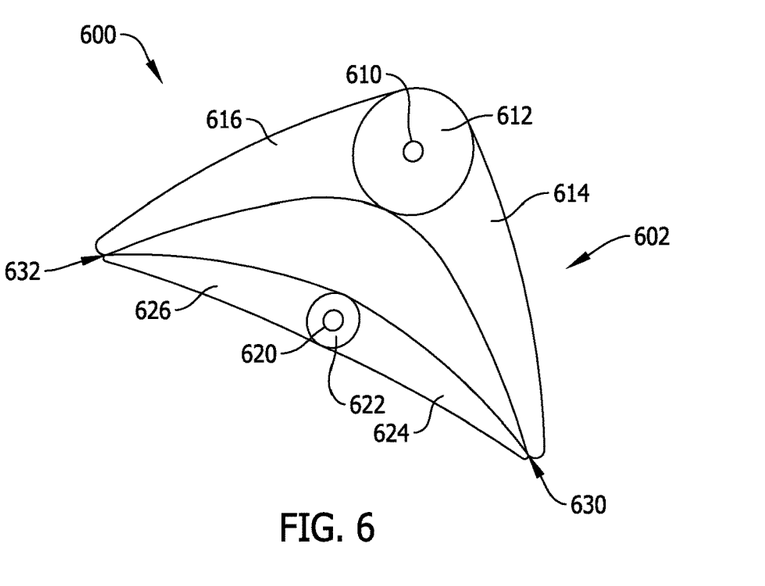
FIG. 6 depicts a second alternative embodiment of a vent area variation component of the cowl vent nozzle area control system shown in FIGS. 1-3 in an open or low-pressure configuration.
Figure 7:
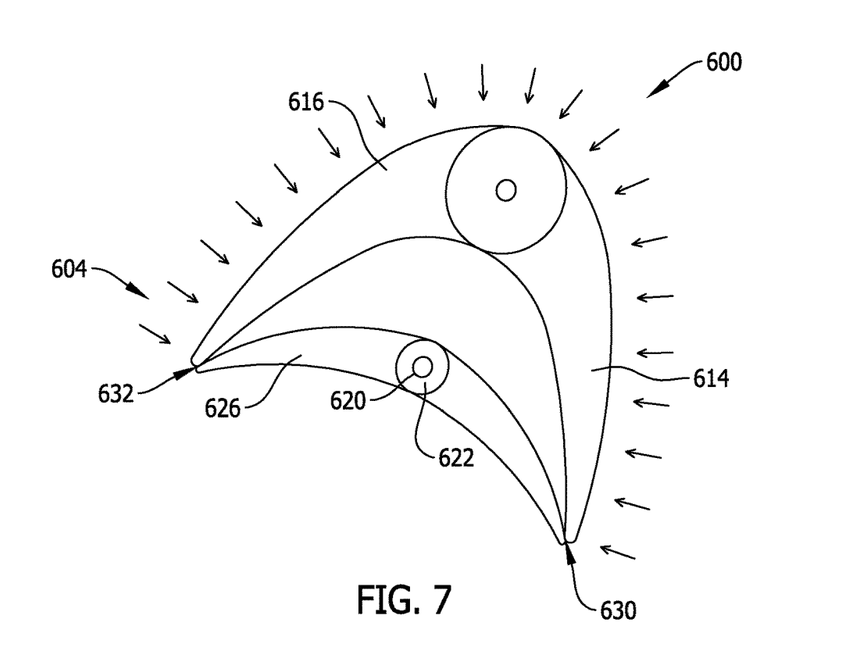
FIG. 7 depicts the vent area variation component shown in FIG. 6 in a partially closed or high-pressure configuration.

FIGS. 6 and 7 illustrate a second alternative embodiment of a vent area variation component 600 of cowl vent nozzle area control system 150. More specifically, FIG. 6 depicts vent area variation component 600 in an open or low-pressure configuration, and FIG. 7 depicts vent area variation component 600 in a partially closed or high-pressure configuration. Vent area variation component 600 may be similar to vent area variation component 154 (shown in FIG. 3). Vent area variation component 600 includes a first pin 610, a first hinge 612, a first plate 614, a second plate 616, a second pin 620, a second hinge 622, a third plate 624, and a fourth plate 626. First hinge 612 surrounds first pin 610, which provides a rotation axis for first hinge 612. First plate 614 and second plate 616 are coupled to first hinge 612. Second hinge 622 surrounds second pin 620, which provides a rotation axis for second hinge 622. Third plate 624 and fourth plate 626 are coupled to second hinge 622. First plate 614 is coupled to third plate 624 at a first joint 630. Accordingly, movement of one of first plate 614 and third plate 624 actuates movement of the other of first plate 614 and third plate 624. Similarly, second plate 616 is coupled to fourth plate 626 at a second joint 632. Movement of one of second plate 616 and fourth plate 626 actuates movement of the other of second plate 616 and fourth plate 626. Vent area variation component 600 may also include one or more springs or other tensioning components at first hinge 612 and/or second hinge 622, such that plates 614, 616, 624, and 626 are maintained in open configuration 602 at low pressures (e.g., at high altitudes during cruise conditions). In addition, such a tensioning component facilitates contraction of one or more of plates 614, 616, 624, and 626 under high-pressure conditions (e.g., at lower altitudes during take-off or landing conditions). In other words, under high-pressure conditions, one or more of plates 614, 616, 624, and 626 rotates about a respective hinge 612, 622 to transition vent area variation component 600 into closed configuration 604.

Cowl vent nozzle area control system 150 may include a plurality of vent area variation components 600 positioned in cowl vent nozzle 134, for example, at regular intervals therearound. First and/or second pin 610, 620 of each vent area variation component 600 may be coupled to core cowl 120 and/or primary nozzle 131, and may span across cowl vent nozzle 134 from core cowl 120 to primary nozzle 131. Accordingly, when vent area variation component 600 is in open configuration 602 at low pressures (e.g., during cruise), core cowl vent area V may be reduced, as a portion of core cowl vent area V is blocked by open plates 614, 616, 624, 626. When vent area variation component 600 is in closed configuration 604 at high pressures, core cowl vent area V may be substantially unobstructed by plates 614, 616, 624, and/or 626, such that core cowl vent area V is at a maximum.

Figure 8:
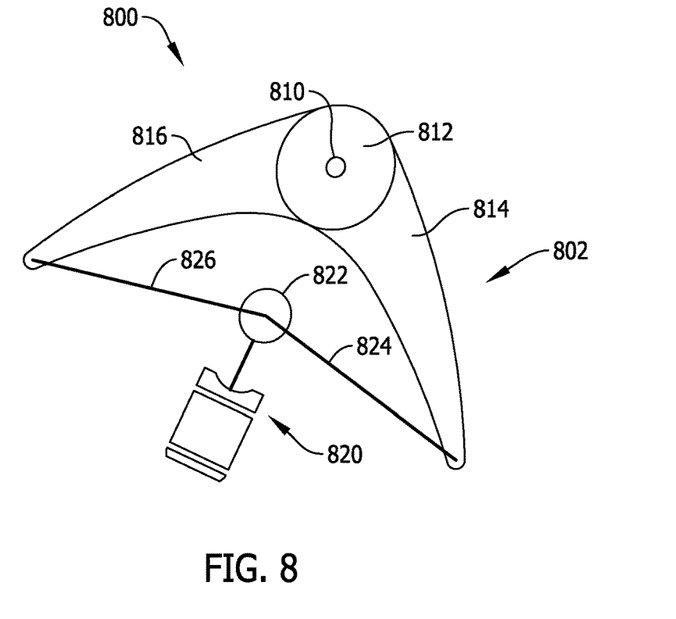
FIG. 8 depicts a third alternative embodiment of a vent area variation component of the cowl vent nozzle area control system shown in FIGS. 1-3 in an open configuration.
Figure 9:
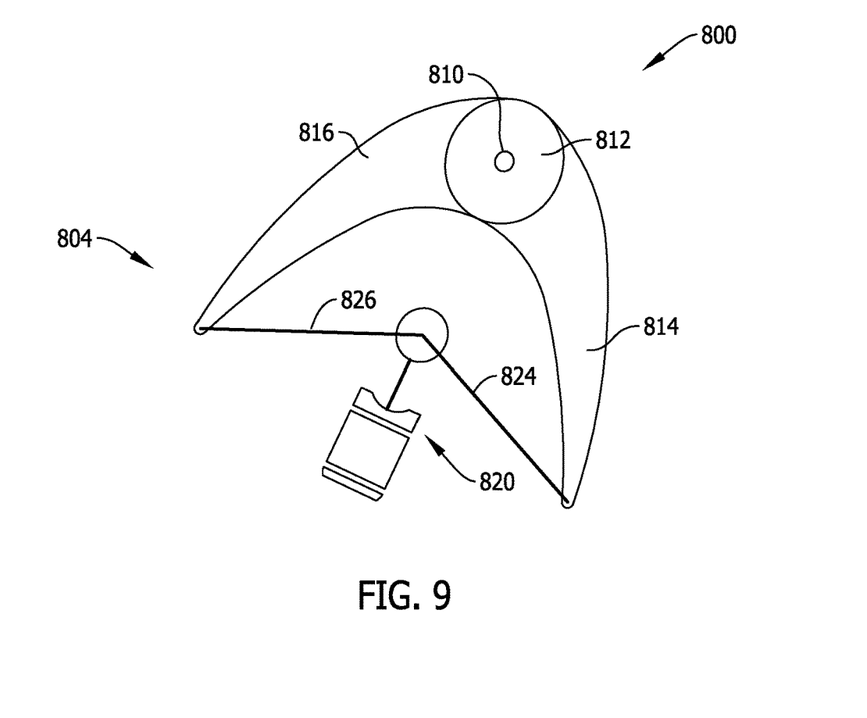
FIG. 9 depicts the vent area variation component shown in FIG. 8 in a partially closed configuration.

FIGS. 8 and 9 illustrate a third alternative embodiment of a vent area variation component 800 of cowl vent nozzle area control system 150. More specifically, FIG. 8 depicts vent area variation component 800 in an open configuration, and FIG. 9 depicts vent area variation component 800 in a partially closed configuration. Vent area variation component 800 may be similar to vent area variation component 154 (shown in FIG. 3). Vent area variation component 800 includes a pin 810, a hinge 812, a first plate 814, a second plate 816, and a hydraulic mechanism 820. Hinge 812 surrounds pin 810, which provides a rotation axis for hinge 812. First plate 814 and second plate 816 are coupled to hinge 812. Hydraulic mechanism 820 includes a rod 822, a first connector 824, and a second connector 826. First connector 824 and second connector 826 may be a single component (e.g., a single wire) or may be discrete components (e.g., two wires, pins, etc.). First connector 824 is coupled to rod 822 and first plate 814. Second connector 826 is coupled to rod 822 and second plate 816. Hydraulic mechanism 820 is configured to cause one or both of plates 814, 816 to rotate about hinge 812 by translating rod 822. Upon translation of rod 822 by cowl vent nozzle area control system 150, connectors 824, 826 actuate movement of plates 814, 816, respectively, to vary core cowl vent area V.

Cowl vent nozzle area control system 150 may include a plurality of vent area variation components 800 positioned in cowl vent nozzle 134, for example, at regular intervals therearound. Pin 810 of each vent area variation component 800 may be coupled to core cowl 120 and/or primary nozzle 131, and may span across cowl vent nozzle 134 from core cowl 120 to primary nozzle 131. Accordingly, when vent area variation component 800 is in open configuration 802 (e.g., during cruise), core cowl vent area V may be reduced, as a portion of core cowl vent area V is blocked by open plates 814, 816. When vent area variation component 800 is in closed configuration 804, core cowl vent area V may be substantially unobstructed by plates 814 and/or 816, such that core cowl vent area V is at a maximum.

Figure 10:
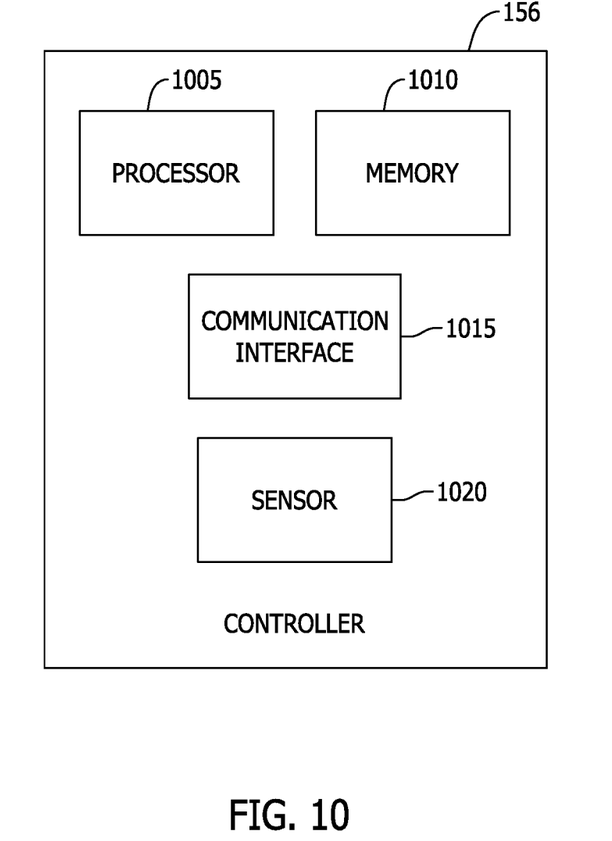
FIG. 10 is a schematic block diagram of an example controller of the cowl vent nozzle area control system shown in FIGS. 1-3.

FIG. 10 is a schematic block diagram of an example controller 156 (shown in FIG. 3) of cowl vent nozzle area control system 150 (shown in FIGS. 1-3). Controller 156 includes a processor 1005 for executing instructions. Instructions may be stored in a memory area 1010, for example. Processor 1005 may include one or more processing units (e.g., in a multi-core configuration) for executing instructions. The instructions may be executed within a variety of different operating systems on controller 156. Processor 1005 is configured to execute the processes described herein for controlling various components of cowl vent nozzle area control system 150.

Processor 1005 is operatively coupled to a communication interface 1015 such that controller 156 is capable of communicating with a remote device such as a one or more aircraft control systems (not shown) and/or sensing or measuring components. Communication interface 1015 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). For example, communication interface 1015 be in wired or wireless communication with an aircraft control system and may receive signals (e.g., requests or instructions) therefrom to vary core cowl vent area V.

Memory area 1010 is any device allowing information such as executable instructions and/or other data to be stored and retrieved. Memory area 1010 may include one or more computer-readable media. Memory area 1010 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Controller 156 may further include one or more sensors 1020, which are configured to measure one or more parameters at or around cowl vent nozzle 134. For example, sensor 1020 may measure temperature, air pressure, and/or air flow at one or more locations of cowl vent nozzle 134. Sensor 1020 generates an output signal that may be used by processor 1005 to vary cowl vent area V (e.g., in a feedback loop or according to particular threshold values).

The above-described core cowl vent nozzle area control systems provide an efficient method for varying a core cowl vent area of a cowl vent nozzle. Specifically, the above-described cowl vent nozzle area control system is configured to increase the core cowl vent area during "worse-case" conditions and decrease the core cowl vent area during other conditions such as cruise. The cowl vent nozzle area control system is configured to move at least a portion of the core cowl in an axial and/or radial direction in certain embodiments, and is configured to move at least a portion of the primary nozzle in an axial and/or radial direction in other embodiments. Additional components, such as a thermal control system and/or a vent variation mechanism, may be employed to implement or improve variation of the core cowl vent area. The above-described embodiments of methods and systems for cowl vent nozzle area control facilitate improved thrust production and engine performance during all stages of a flight. This results in reduced specific fuel consumption, which may be about 0.2%-0.25% reduction in certain embodiments.

Exemplary embodiments of cowl vent nozzle area control systems are described above in detail. The cowl vent nozzle area control systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring vent nozzle area control, and are not limited to practice with only the systems and methods as described herein. Rather, the exemplary embodiment can be implemented and utilized in connection with many other machinery applications that are currently configured to receive and accept nozzle area control systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable core cowl vent nozzle system comprising:
    a core casing at least partially surrounding a core engine of a gas turbine engine;
    a primary nozzle at least partially surrounding an engine aft centerbody of the gas turbine engine;
    a core cowl extending aftward from said core casing;
    a core cowl vent nozzle defined between said core cowl and said primary nozzle, said core cowl vent nozzle defining a core cowl vent area;
    a vent area variation component coupled to at least one of said core cowl and said primary nozzle, said vent area variation component comprising a plate or flap rotatable about a pivot, the vent area variation component movable to variably block a portion of the core cowl vent area so as to vary the amount of air flow through the core cowl vent nozzle; and
    a thermal control system comprising one or more pipes configured to deliver supply air to the vent area variation component and one or more valves configured to vary the amount of supply air delivered to the vent area variation component in response to instructions from a controller, the supply air actively contacting the plate or flap to cause expansion and contraction of the vent area variation component.

2. The system of claim 1, wherein at least a portion of said core cowl is translatable in an axial direction with respect to said primary nozzle to vary the core cowl vent area.

3. The system of claim 1, wherein at least a portion of said core cowl is translatable in a radial direction with respect to said primary nozzle to vary the core cowl vent area.

4. The system of claim 1, wherein at least a portion of said core cowl is rotatable about a pivot in a radial direction with respect to said primary nozzle to vary the core cowl vent area.

5. The system of claim 1, wherein at least a portion of said primary nozzle is translatable in an axial direction to vary the core cowl vent area.

6. The system of claim 1, wherein at least a portion of said primary nozzle is translatable in a radial direction with respect to said core cowl to vary the core cowl vent area.

7. The system of claim 1, wherein the one or more pipes are in flow communication with and configured to receive the supply air from at least one of a fan assembly, a compressor section, and/or a hot gas path.

8. A method of varying air flow through a core cowl vent nozzle defining a core cowl vent area, said method comprising:
    delivering supply air to a vent area variation component while varying with a valve the amount of supply air delivered to the vent area variation component in response to instructions from a controller;
    actively contacting with the supply air, a plate or flap of the vent area variation component to cause expansion and contraction of the vent area variation component, the vent area variation component moving to variably block a portion of the core cowl vent area so as to vary the amount of air flow through the core cowl vent nozzle;
    wherein the vent area variation component is coupled to at least one of a core cowl and a primary nozzle, the core cowl extending aftward from a core casing that at least partially surrounds a core engine of a gas turbine engine, and the primary nozzle at least partially surrounding an engine aft centerbody of the gas turbine engine.

9. The method of claim 8, comprising translating at least a portion of the core cowl in an axial direction with respect to the primary nozzle to vary the core cowl vent area.

10. The method of claim 8, comprising translating at least a portion of the core cowl in a radial direction with respect to the primary nozzle to vary the core cowl vent area.

11. The method of claim 8, comprising rotating at least a portion of the core cowl in a radial direction about a pivot to vary the core cowl vent area.

12. The method of claim 8, comprising translating at least a portion of the primary nozzle in one of an axial direction and a radial direction to vary the core cowl vent area.

13. The method of claim 8, comprising receiving the supply air from at least one of a fan assembly, a compressor section, and/or a hot gas path.

14. A turbofan engine comprising:
a core engine including a multistage compressor;
a fan powered by a power turbine driven by gas generated in said core engine;
a fan bypass duct at least partially surrounding said core engine and said fan; and
a variable core cowl vent nozzle system comprising:
a core casing at least partially surrounding said core engine;
a primary nozzle at least partially surrounding an engine aft centerbody of the gas turbine engine;
a core cowl extending aftward from said core casing;
a core cowl vent nozzle defined between said core cowl and said primary nozzle, said core cowl vent nozzle defining a core cowl vent area;
a vent area variation component coupled to at least one of said core cowl and said primary nozzle, said vent area variation component comprising a plate or flap rotatable about a pivot, the vent area variation component movable to variably block a portion of the core cowl vent area so as to vary the amount of air flow through the core cowl vent nozzle; and
a thermal control system comprising one or more pipes configured to deliver supply air to the vent area variation component and one or more valves configured to vary the amount of supply air delivered to the vent area variation component in response to instructions from a controller, the supply air actively contacting the plate or flap to cause expansion and contraction of the vent area variation component.

15. The turbofan engine of claim 14, wherein at least a portion of said core cowl is translatable in an axial direction with respect to said primary nozzle to vary the core cowl vent area.

16. The turbofan engine of claim 14, wherein at least a portion of said core cowl is translatable in a radial direction with respect to said primary nozzle to vary the core cowl vent area.

17. The turbofan engine of claim 14, wherein at least a portion of said primary nozzle is translatable in an axial direction to vary the core cowl vent area.

18. The turbofan engine of claim 14, wherein at least a portion of said primary nozzle is translatable in a radial direction with respect to said core cowl to vary the core cowl vent area.

19. The turbofan engine of claim 14, wherein at least a portion of said primary nozzle is rotatable about a pivot in a radial direction to vary the core cowl vent area.

20. The turbofan engine of claim 14, wherein the one or more pipes are in flow communication with and configured to receive the supply air from at least one of a fan assembly, a compressor section, and/or a hot gas path.

* * * * *